(12) United States Patent
Shaffer et al.

(10) Patent No.: US 12,719,714 B2
(45) Date of Patent: Aug. 25, 2026

(54) SYSTEM, APPARATUS AND METHOD FOR AUTOMATICALLY ASSOCIATING A THERMOSTAT WITH A LOCATION

(71) Applicant: Universal Electronics Inc., Scottsdale, AZ (US)

(72) Inventors: Jacob Shaffer, Phoenix, AZ (US); Michael Hoffman, Poway, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 107 days.

(21) Appl. No.: 18/735,452

(22) Filed: Jun. 6, 2024

(65) Prior Publication Data

US 2025/0377125 A1 Dec. 11, 2025

Related U.S. Application Data

(60) Provisional application No. 63/579,706, filed on Aug. 30, 2023, provisional application No. 63/579,115, filed on Aug. 28, 2023.

(51) Int. Cl.
*F24F 11/54* (2018.01)
*H04L 12/28* (2006.01)

(52) U.S. Cl.
CPC .......... *H04L 12/2809* (2013.01); *F24F 11/54* (2018.01); *H04L 12/2823* (2013.01)

(58) Field of Classification Search
CPC .. F24F 11/54; F24F 11/50; F24F 11/52; F24F 11/88
See application file for complete search history.

(56) References Cited

U.S. PATENT DOCUMENTS

| | | | | |
|---|---|---|---|---|
| 5,944,098 | A * | 8/1999 | Jackson | F24F 11/46 165/207 |
| 5,950,709 | A | 9/1999 | Krueger | |
| 9,791,839 | B2 * | 10/2017 | Matsuoka | H04L 12/2816 |
| 10,678,200 | B2 * | 6/2020 | Matsuoka | G06Q 50/06 |
| 12,247,754 | B2 * | 3/2025 | Mundy | F24F 11/30 |
| 2005/0040247 | A1 * | 2/2005 | Pouchak | F24F 11/46 236/44 C |
| 2005/0288824 | A1 * | 12/2005 | Fisher | G05D 23/1934 700/277 |
| 2007/0228183 | A1 | 10/2007 | Kennedy | |
| 2009/0008463 | A1 * | 1/2009 | Holland | F24F 11/56 236/51 |

(Continued)

OTHER PUBLICATIONS

International Search Report and Written Opinion of application No. PCT/US2025/032221, dated Aug. 13, 2025, 12 pp.

*Primary Examiner* — Nelson J Nieves
(74) *Attorney, Agent, or Firm* — Greenberg Traurig, LLP

(57) ABSTRACT

A system, method and apparatus for automatically associating a thermostat to a location where the thermostat is installed. The thermostat mounts to a subbase installed on a wall, the subbase comprising an information storage device for storing location information where the subbase has been installed. When the thermostat is connected to the subbase and powered on, the thermostat transmits an identification of the thermostat and the location information to a central thermostat controller so that the central thermostat controller can identify a location where a particular thermostat is located for purposes of configuring the thermostat in accordance with the location.

18 Claims, 11 Drawing Sheets

(56) References Cited

U.S. PATENT DOCUMENTS

2009/0045263 A1 2/2009 Mueller
2009/0057424 A1* 3/2009 Sullivan .................. F24F 11/63 700/83
2010/0148919 A1* 6/2010 Roberts .................... G07C 3/00 340/5.2
2011/0321105 A1* 12/2011 Ogle .................. H04N 21/6581 725/98
2012/0061480 A1* 3/2012 Deligiannis ............ G05B 15/02 340/5.2
2013/0310988 A1* 11/2013 Sartain ..................... F24F 11/52 700/276
2013/0338839 A1* 12/2013 Rogers ..................... F24F 11/58 700/278
2014/0052300 A1* 2/2014 Matsuoka ................ F24F 11/46 700/276
2014/0203091 A1* 7/2014 Nair ................... G05D 23/1905 236/51
2014/0277748 A1* 9/2014 Dyess ................ G05D 23/1902 700/275
2016/0116183 A1* 4/2016 Lazar ................. G05D 23/1905 236/1 C
2016/0178230 A1 6/2016 Vendt
2019/0277531 A1* 9/2019 Gillette .................... F24F 11/56
2020/0149764 A1* 5/2020 Sinha ................. G05D 23/1905
2021/0140665 A1 5/2021 Rigg
2022/0307719 A1* 9/2022 Boyd ....................... F24F 11/65
2023/0054461 A1* 2/2023 Sakai ....................... F24F 11/50
2023/0288088 A1* 9/2023 Klein ....................... F24F 11/62
2023/0318998 A1* 10/2023 Alexander .......... H04L 12/2818 340/870.02
2025/0133638 A1* 4/2025 Zhang .................... H05B 47/18

* cited by examiner

SYSTEM, APPARATUS AND METHOD FOR AUTOMATICALLY ASSOCIATING A THERMOSTAT WITH A LOCATION

FIELD OF THE DISCLOSURE

The present disclosure relates generally to supervisory control of a thermostat and more particularly to systems, apparatus and methods for automatically associating a thermostat with a location where the thermostat has been installed.

BACKGROUND OF RELATED ART

Thermostats have been used for decades to control room temperatures based on user settings and temperature sensors commonly built into the thermostats. Thermostats typically control heating and/or cooling equipment (HVAC) by turning the equipment on or off. For example, when the room temperature where a thermostat is located drops below a heating setpoint, the thermostat sends a signal to heating equipment to begin heating the room. When the setpoint has been reached or exceeded, the thermostat sends another signal to the heating equipment to turn off.

Multiple Dwelling Units (MDUs), such as hotels and apartments, are looking for better ways to manage their thermostats for energy savings, maintenance, etc. One way is to use some form of supervisory control to the thermostat in each room/suite/apartment of an MDU, such as changing the temperature setpoint during unoccupied times, loading initial temperature profiles, receiving feedback of ambient air temperature, etc. In an MDU setting, a thermostat is typically assigned to a particular room and an association between the thermostat and the room is provided to a central controller, so that the central controller knows which thermostat to control when the room is vacant, occupied, too hot, too cold, etc. One way of doing this is to assign an identifier to each thermostat, such as a MAC ID, and associate the identifier with a location where the thermostat is installed, i.e., a room identifier, such as master bedroom, living room, hotel room number, an alpha-numeric code, etc. The identifier and associated location/room identifier is then typically stored in a database.

One problem with assigning a thermostat identifier and associating location/room information with a particular thermostat is that anytime the thermostat is replaced, the information in the database must be updated with a new identifier of the new thermostat. This may occur manually, which is subject to human error, is time intensive and therefore costly. If this is not done accurately, the supervisory control may be controlling the temperature setpoint in the wrong room(s) and the causing needless cooling and heating or, alternatively, not activating cooling and heating equipment as intended.

SUMMARY

Embodiments of a system, method and apparatus are described, for automatically associating a thermostat to a location where the thermostat is installed. In one embodiment, an apparatus is described, comprising a subbase for receiving and securing the thermostat thereon, the subbase comprising an information storage device mounted to the subbase for storing location information where the subbase has been installed, and the thermostat, comprising a local wireless communication interface, and a subbase communication interface for receiving information from the information storage device mounted to the subbase, wherein upon securing the thermostat to the subbase and powering up the thermostat, the thermostat retrieves the location information from the subbase via the subbase communication interface.

In another embodiment, a method is described, performed by a thermostat, for automatically associating a thermostat to a location where the thermostat is installed, the method comprising receiving, by the thermostat from a subbase to which it is coupled, location information of where the subbase has been installed, and storing an identification of the thermostat and the location information in a memory of the thermostat.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The following description of example systems, methods and apparatus is not intended to limit the scope of the description to the precise form or forms detailed herein. Instead, the following description is intended to be illustrative so that others may follow its teachings.

In one example, the objective of the embodiments of the invention is to automatically associate a particular thermostat to a location where the thermostat has been installed. This allows a central thermostat controller to control room temperatures in an MDU setting, where multiple thermostats are controlled by the central thermostat controller. The disclosed systems, apparatus and methods herein may reduce errors in room temperature control when maintaining thermostat systems.

For example, in an MDU setting, when there is a problem with a thermostat, the thermostat may be replaced and a subbase that is attached to the wall and hard-wired (typically) to one or more HVAC systems typically not replaced. Embodiments of the present invention utilize this feature by adding an information storage device to the subbase that stores pertinent information regarding a location of the subbase, and, in some embodiments, one or more of an identification of HVAC equipment coupled to the subbase, configuration information pertaining to the HVAC equipment, one or more temperature profiles, an identification and password of a local Wi-Fi network, or other similar network, to which a thermostat should connect, etc. By storing this information in the information storage device of the subbase, the stored information may be provided to a new thermostat installed on the subbase, and the new thermostat identify itself to the central thermostat controller to store an identification of the new thermostat with the subbase location in a database of the central thermostat controller. This allows an automatic update to the database any time a new thermostat is installed onto a subbase in an MDU setting, so that the central thermostat controller may properly control room temperatures in each room of the MDU.

Figure 1:
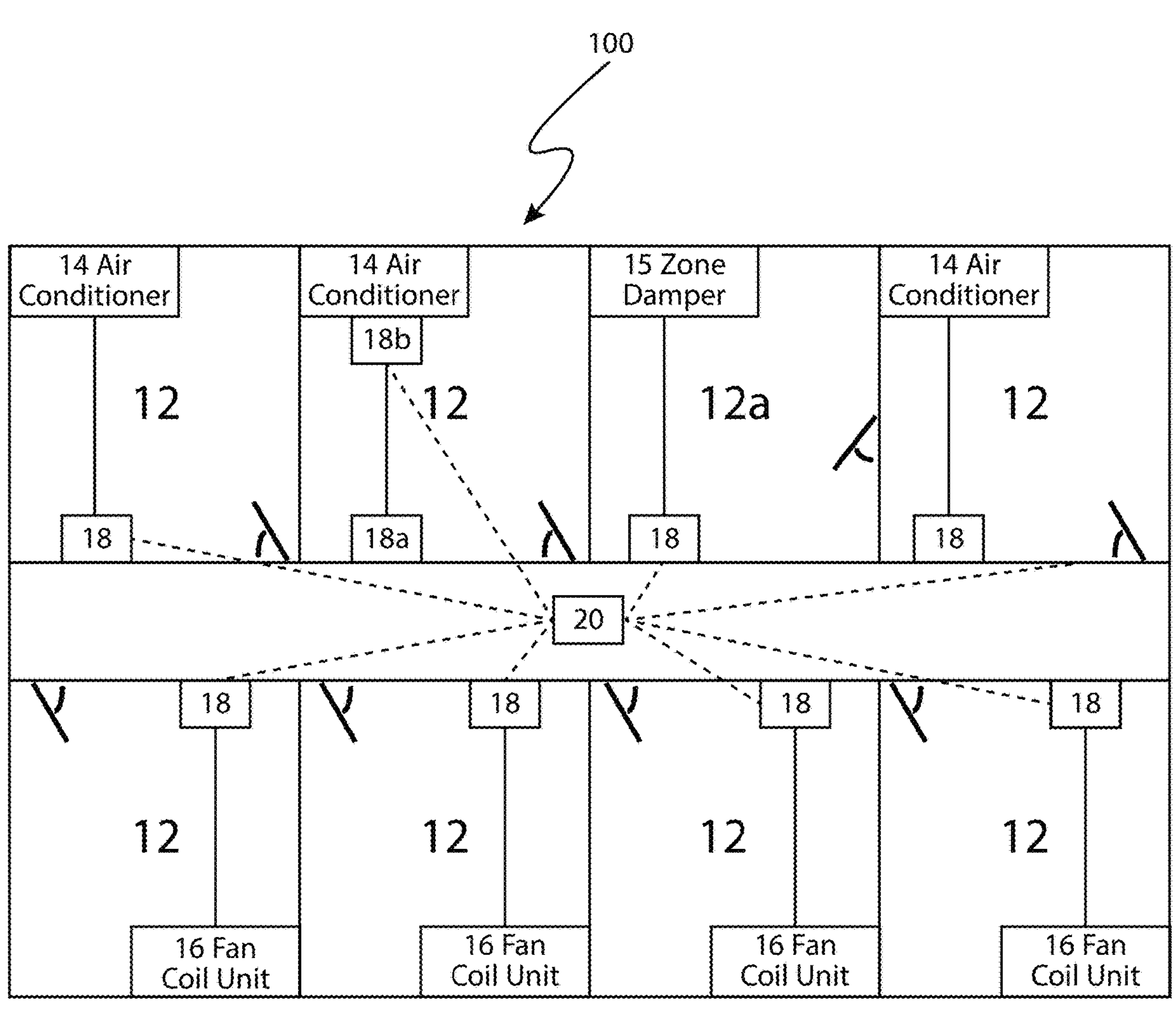
FIG. 1 is a top, plan view of an example MDU structure comprising a plurality of locations/rooms, each location/room having a respective thermostat and subbase, the thermostats in communication with a central thermostat controller.

Referring now to FIG. 1, an example of a typical MDU 100 arrangement is illustrated. More precisely, FIG. 1 is a top, plan view of a single floor MDU structure comprising a plurality of rooms 12 each having HVAC equipment, such as an air conditioner 14, zone damper 15 and/or fan coil unit 16 and at least one thermostat 18 per room 12 that controls the temperature of ambient air in each room 12. It will be understood that each of the rooms 12 may be further divided into additional rooms 12*a* and/or zones that each may independently include a separate thermostat 18, air conditioner 14, zone damper 15 or fan coil unit 16. It will be understood that the thermostat typically has several functions, and those functions may be located in different locations such as a user interface and ambient air temperature measurement portion 18*a* and a remote air temperature sensor 18*b* located on or near the source of conditioned air from air conditioner 14, zone damper 15 or fan coil unit 16 for temperature loop control and external communication to central thermostat controller 20. Either part of thermostat 18*a* and 18*b* may have a fixed subbase that stores location where the subbase, and therefore a respective thermostat, is installed and/or other information, such as default or actual temperature profiles (i.e., dates and times when the ambient air temperature in a room 12 in MDU 100 should be held at a desired temperature), where the location and/or configuration information may be provided to either or both of thermostat 18*a* and/or 18*b* so that either or both thermostats may convey an association between the thermostat and its location to central thermostat controller 20. As is known in the art, each of the thermostats 18 comprises and/or is in communication with one or more respective temperature sensors that sense the ambient temperature of a respective room or zone where the thermostat 18 is located and controls the source of conditioned air for the zone.

Like many modern or "smart" thermostats, each of the thermostats 18 may be programmable to execute one or more temperature profiles in the form of desired temperature setpoints and times when these setpoints should be achieved. These temperature profiles may be locally programmed, but in many instances, it is desirable to configure such profiles by a centralized entity, such as central thermostat controller 20, to assign temperature profiles in each of the rooms 12. For example, central thermostat controller 20 may set each thermostat 18 to warm a respective room 12 or zone to an ambient temperature of 72 degrees Fahrenheit at 7 am when an occupant typically wakes, and of no less than 60 degrees Fahrenheit at 10 pm when an occupant typically goes to bed. Of course, it will be appreciated that the temperature profiles may vary significantly based upon any variety of factors, including current weather, current occupancy, user preferences, cost of electricity, room location, or any other suitable consideration. Based on these factors, the temperature profiles for any particular thermostat 18 may be different than other temperature profiles executed on thermostats in other locations. Hence, a centralized coordination may be desirable for configuring a large number of thermostats in an MDU for purposes of energy efficiency, maintenance, etc.

As with any MDU location, it will be understood that the system thermostats 18 oftentimes need to be changed for maintenance, replacement, relocation, etc. It will further be appreciated that the task of replacing multiple thermostats 18 may be cumbersome if each thermostat 18 needs to be specifically reprogrammed or otherwise have its specific location identified within the central thermostat controller 20.

Figure 2:
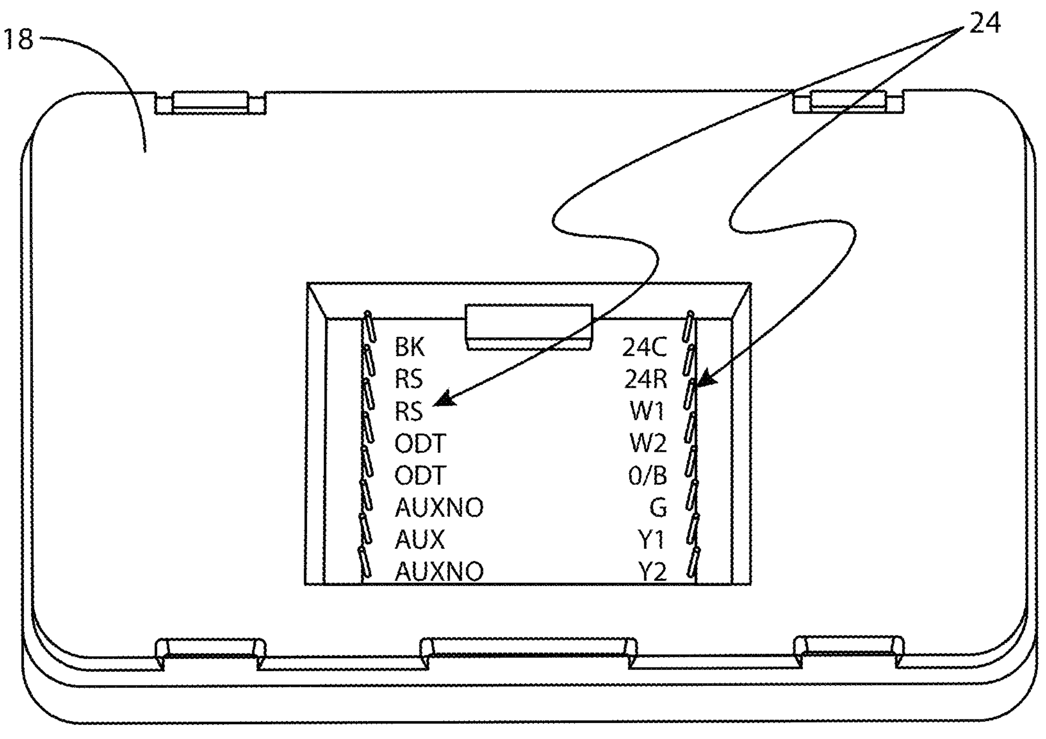
FIG. 2 shows a back side of one of the thermostats as shown in FIG. 1 and a front side of a corresponding subbase.
Figure 2:
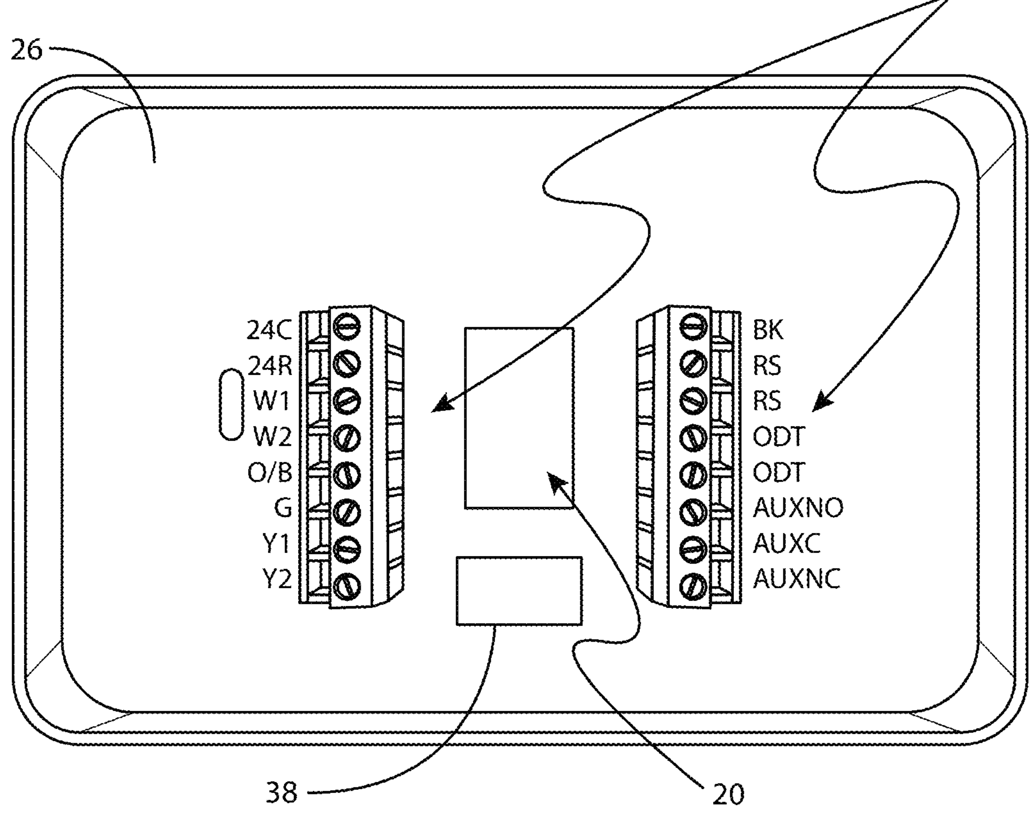

FIG. 2 shows a back side of one of the thermostats 18 as shown in FIG. 1 and a front side of a corresponding subbase 26. Subbase 26 is configured for fixed installation onto a wall of one of the rooms 12 of MDU 100 and is configured to mechanically receive and retain thermostat 18, typically by mechanical tabs or the like such that thermostat 18 is typically "snapped" onto subbase 26. This configuration makes it easy to remove thermostat 18 from subbase 26 in order to reset, repair or to replace thermostat 18. Subbase 26 additionally comprises an information storage device 38 for storing location information of subbase 26 as well, in some embodiments, other information, such as a make and model of one or more HVAC equipment used to heat and/or cool a location where subbase 26 is mounted, one or more temperature profiles, configuration information for operation of the HVAC equipment, an identification of a local-area network and associated password, etc. in some embodiments, information storage device 38 comprises one or more passive components while in other embodiments, information storage device 38 comprises either active components or a combination of active and passive components, as will be described in further detail later here in.

Figure 3:
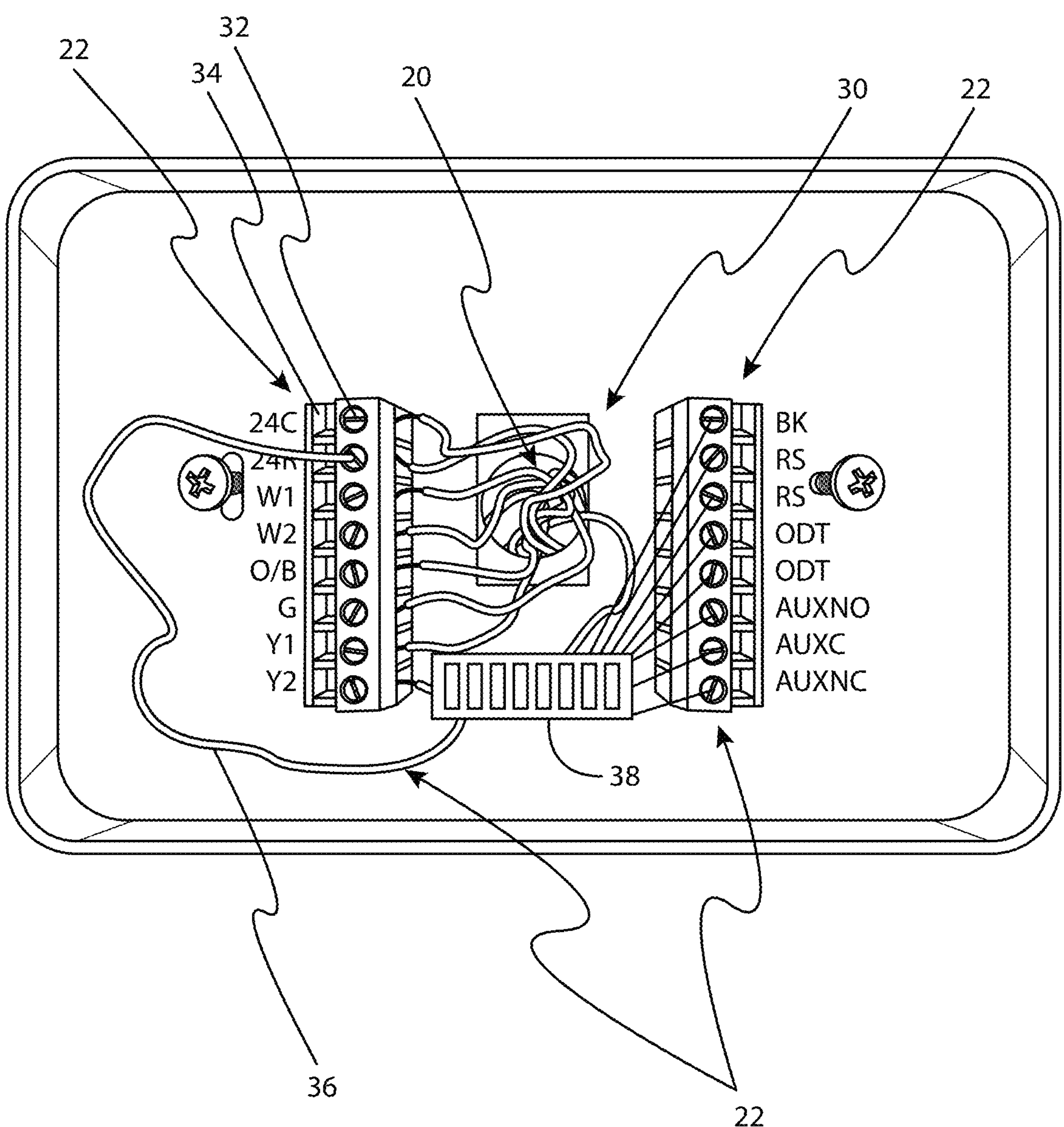
FIG. 3 is a front, plan view of the subbase shown in FIG. 2, fixedly mounted to a wall via one or more screws, mollies, or the like, highlighting an information storage device mounted to the subbase in the form of a dip switch.

FIG. 3 is a front, plan view of subbase 26, fixedly mounted to a wall via one or more screws, mollies, or the like, and a plurality of wires 30 from one or more HVAC units controlled by thermostat 18 protruding from the wall and through opening 20 of subbase 26. Each of the HVAC wires 30 is connected to a particular wiring lug 32 of one or more terminal blocks 22, respectively (only one of 16 terminals is referenced in FIG. 3). In other embodiments, subbase 26 may communicate with HVAC equipment via any suitable communication method, including wireless communications.

Once subbase 26 is fixedly mounted to a wall and any HVAC wires 30 connected to their respective wiring lugs 32, thermostat 18 may then be mechanically coupled to it and an electrical and mechanical connection occurs between each of terminals 34 of the one or more terminal blocks 22 and reciprocal pins 24 on the back of the thermostat 18, as shown in FIG. 2. Thermostat 18 then has electrical connections to the subbase 26 via the terminals 34 and pins 24, and therefore all of the HVAC wires 30 coupled to the terminals 34. Subbase 26 is typically installed in a semi-permanent location and is not typically replaced and/or moved when performing any system maintenance and unless the subbase 26 is defective or needs to be otherwise relocated.

The subbase 26 may comprise information storage device 38 that stores certain information pertaining to subbase 26, thermostat 18 and/or HVAC equipment controlled by thermostat 18, local-area network information, etc. Information storage device 38 may, for example, store location information of where subbase 26, and therefore thermostat 18, is installed so that the location information may be utilized by the central thermostat controller 20 to program or otherwise configure, maintain, data download/upload, or update firmware of thermostat 18. For example, the location information may comprise a hotel name, address, and/or other identifying information of MDU 100 and a location inside MDU 100, such as a room number, apartment number, etc.

Other information stored by information storage device 38 may comprise a make and/or model number and/or configuration of HVAC equipment under the control of thermostat 18, such as a respective air conditioner 14, zone damper 15 and/or fan coil unit 16 that thermostat 18 is controlling. For example, information storage device 38 may store information regarding the configuration of a type of heating and/or cooling equipment that is being controlled by thermostat 18, such as a heat pump or conventional air conditioner or what the fan operation should be set to.

When thermostat 18 is mechanically and electrically coupled to subbase 26 and powered on, at least initially, thermostat 18 may receive the information stored by information storage device 38 using one of a plurality of ways to receive the information, as described in further detail below. After thermostat 18 has received the information stored in information storage device 38, it may initiate communication with central thermostat controller 20 in order to provide information pertaining to thermostat 18, such as identification information (i.e., a serial number, MAC ID, firmware version), and the location information of subbase 26 (and therefore thermostat 18). In response, central thermostat controller 20 may provide certain information to thermostat 18, such as updated firmware and/or one or more temperature profiles and/or operating information pertinent to the particular HVAC equipment under thermostat 18's control, based on the location information.

In many thermostat installations, not all the pins 24 are used that connect thermostat 18 to the terminal blocks 22. In fact, there are many system configurations that need less than the total wire connections available for a thermostat to control an HVAC system. Therefore, some of the pins 24 may be available for other purposes, for example, to provide communication between information storage device 38 and thermostat 18. In the example thermostat 18 shown, only seven (7) connections on the left terminal block 22 are used to control the HVAC equipment. Therefore, one wiring lug 32 on the left terminal block 22 and eight wiring lugs 32 are available on the right terminal block 22 can be utilized to communicate the information stored by information storage device 38.

In one embodiment, information storage device 38 comprises one or more passive electronic components, such as a plurality of switches. In the embodiment shown in FIG. 3, information storage device 38 comprises a dip switch mounted to subbase 26 to pull unused wiring lugs 32 of the right terminal block 22 to a high or low designation. In the current example, where information storage device 38 comprises an 8-pin dip switch, one side of each switch is typically electronically coupled to each other and to a voltage from HVAC equipment from, in this example, a wire 36 attached to a lug 32 of the left terminal block 22 labeled 24R. The other side of each switch is wired to a lug 32 on the right terminal block 22 that is not being used by HVAC equipment, in this example, the lugs on the right terminal block. This arrangement can be used to designate up to 256 rooms with an 8-pin switch (or 128 rooms if one pin is needed for reference) by setting the dip switches to provide a unique code to thermostat 18, once connected to subbase 26. For example, some of the connections between the dip switch and the lugs may have zero voltage while others may be energized with a voltage corresponding to the voltage of lug 24R. In one embodiment, thermostat 18, central thermostat controller 20, or both, may store a decoder table to identify a location, i.e., a room number, apartment number, etc., where the subbase 26, and thus thermostat 18, is located. Then, thermostat 18 may communicate the location information to central thermostat controller 20, either the raw code from the dip switch or an associated location identifier, such as a room number, and apartment number etc., Using the internally-stored decoder table. In another embodiment where thermostat 18 does not store a decoder table, thermostat 18 may provide a raw number to central thermostat controller 20 corresponding to the dip switch settings, i.e., a number between 0 and 255 (or 1 and 256), to central thermostat controller 20, and central thermostat controller 20 may convert the raw number from thermostat 18 into a particular location, such as a room number, apartment number, etc., using the decoder table stored therein.

A room number assignment may be labeled and/or otherwise marked on the front of the subbase 26, such as for instance with a permanent marker for quick reference.

Figure 4A:
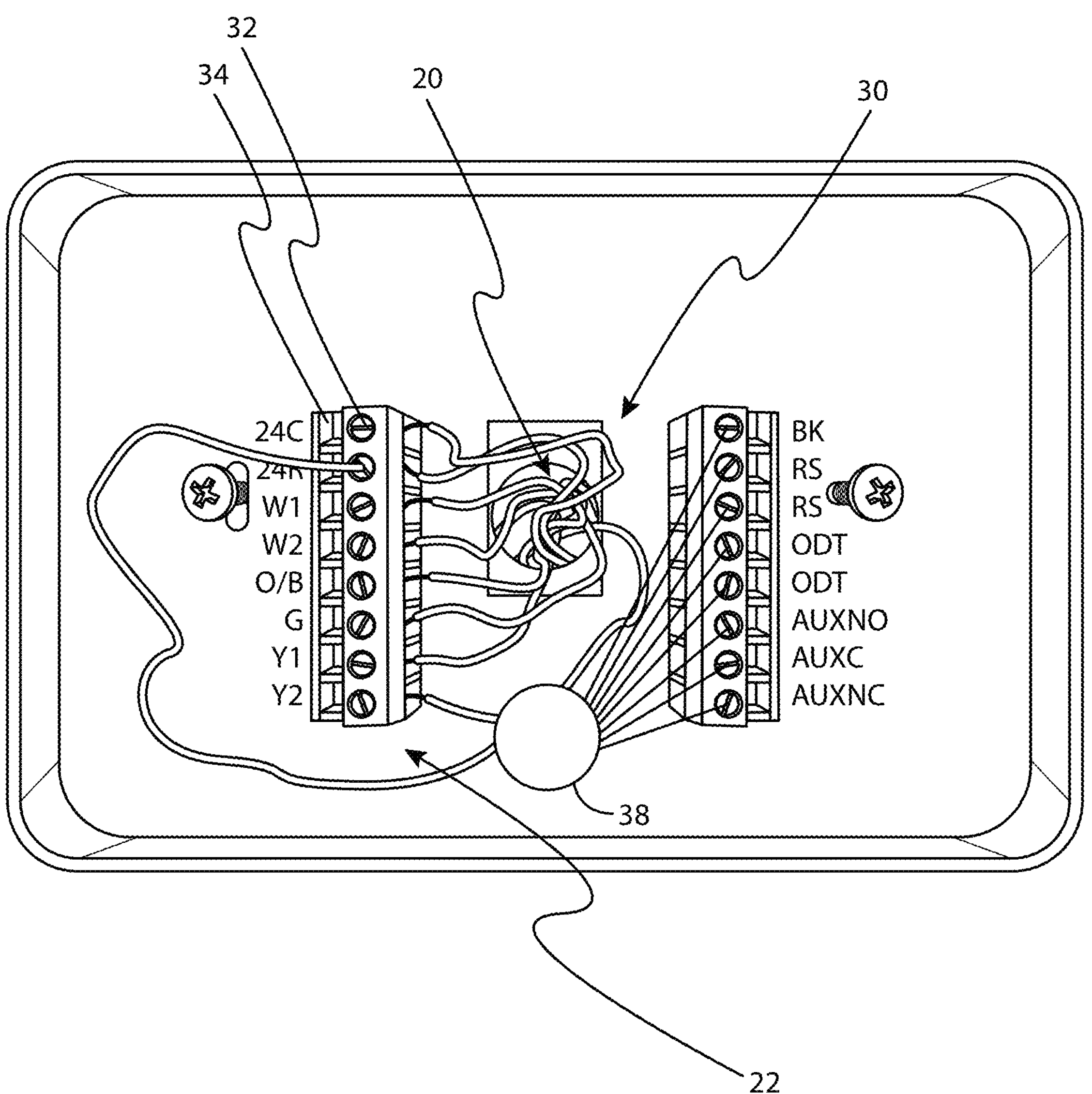
FIG. 4A is a front, plan view of the subbase shown in FIG. 2, showing another embodiment of the information storage device comprising a multi-position encoder.

In another example of a passive programming technique, as shown in FIG. 4A, information storage device 38 may comprise a multi-position encoder to store the location information of subbase 26. Common rotary encoders, for example, may have different levels of resistance for each coded digit and coupled to unused wiring lugs 32 on one or more terminal blocks 22, as shown, and can, therefore, be decoded by thermostat 26 to identify the room number the subbase 26 is assigned to. Reading the room number on the encoders provides for an easier identification of the room number assignment just by reading the encoder settings. In this example, the number of pins needed is the same as the number of encoders on the subbase plus, optionally, one additional for reference.

In embodiments utilizing an encoder or one or more switches, it may be beneficial to locate such a device on the back side of subbase 26 (i.e., facing the mounting surface upon installation) so that the it is more difficult to access, and therefore tamper with, the device after installation. In this case, a room number or other location identifier may, once again, be marked on the front of the subbase 26 with any suitable marking method including with permanent marker for quick reference.

Figure 4B:
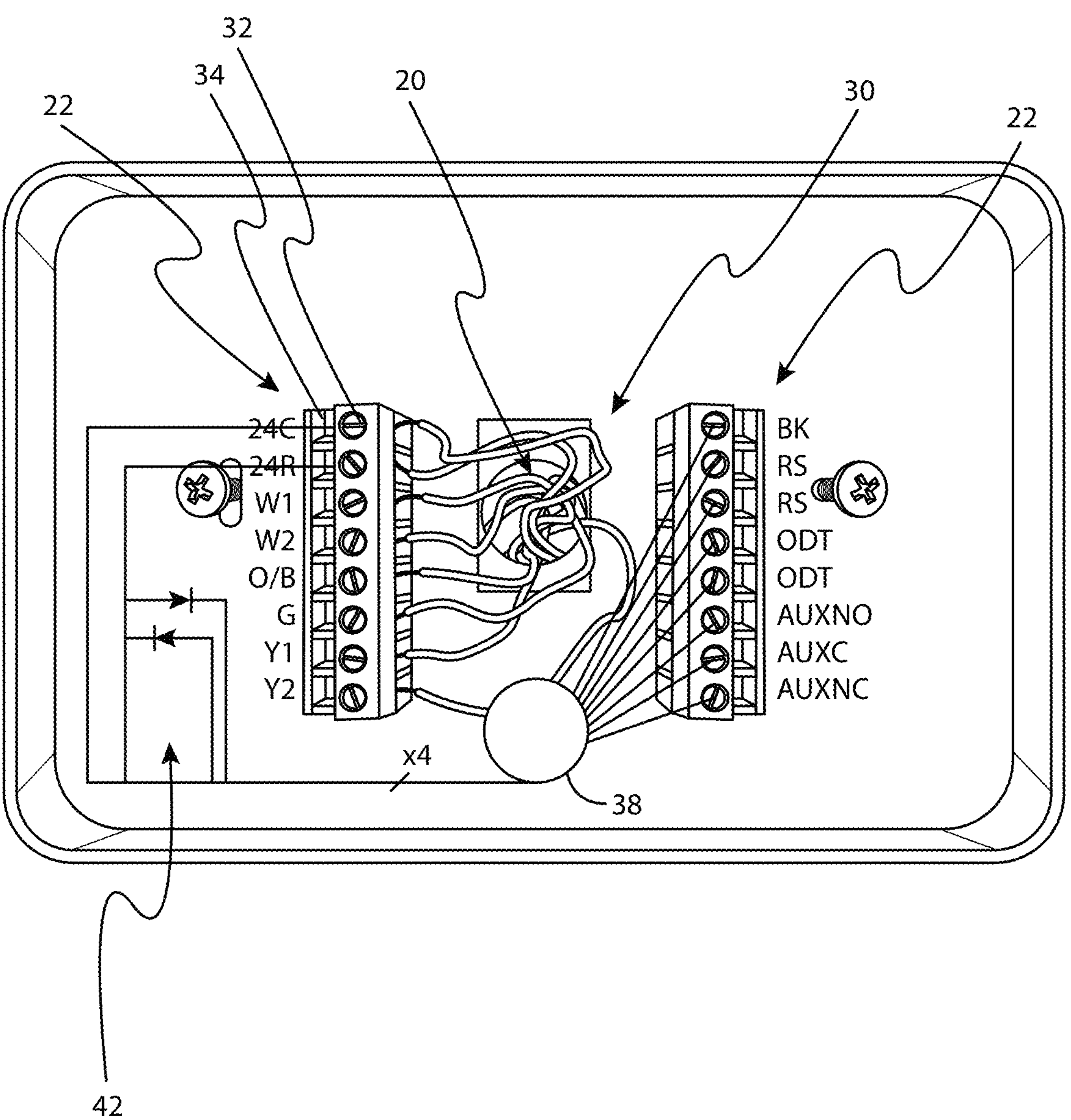
FIG. 4B is a front, plan view of the subbase shown in FIG. 2, showing another embodiment of the information storage device comprising a multi-position encoder plus a plurality of diodes.

In another embodiment, as shown in FIG. 4B, information storage device 38 may comprise a multi-position encoder and one or more diodes 42 to block both halves, upper half, lower half, or neither half of a sine wave signal on a 24 VAC power line typically provided by HVAC equipment to subbase 26. In this embodiment, the encoder receives for inputs; a full-wave 24 volt AC signal, ground, an upper half-wave rectified 24 volt AC signal from one of the diodes, and a lower half-wave rectified 24 volt AC signal from the other diode. With eight output lines, the encoder can provide 4096 unique codes, each code associated with a particular location.

Figure 5:
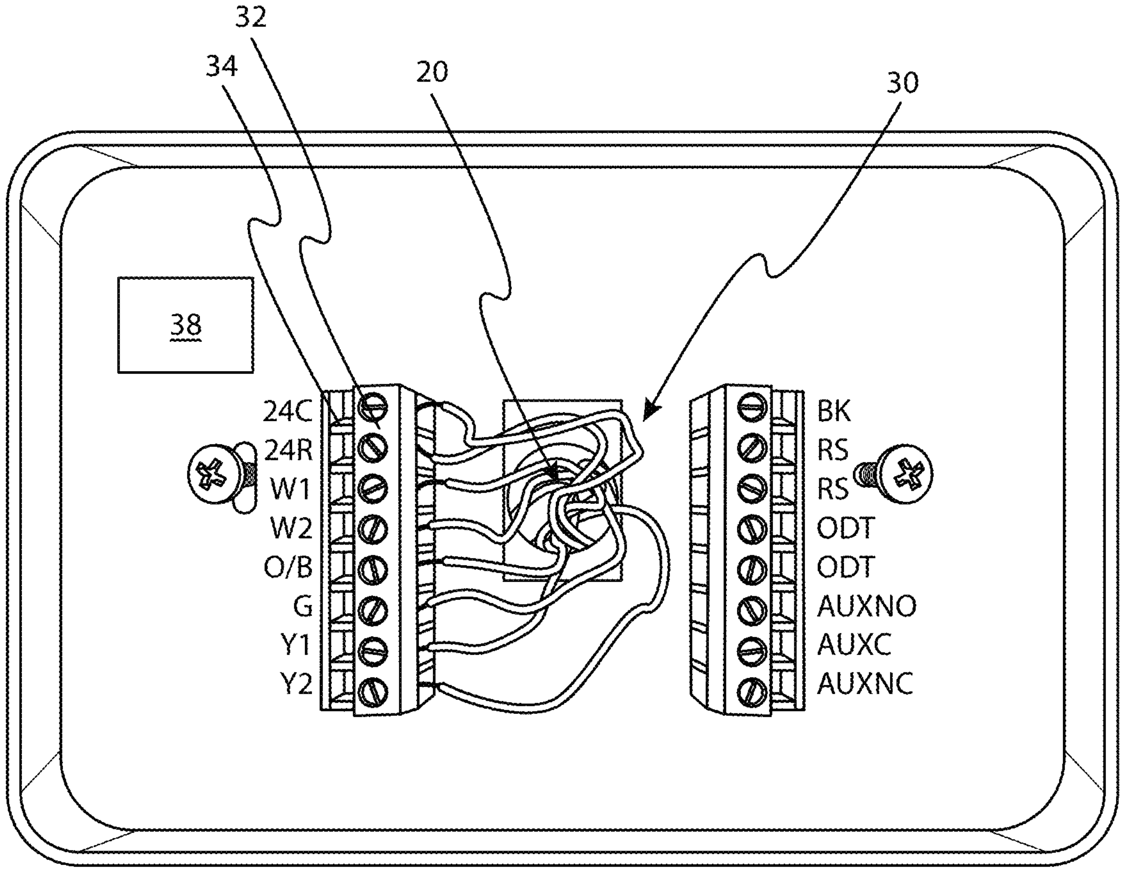
FIG. 5 is a front, plan view of the subbase shown in FIG. 2, showing another embodiment of the information storage device comprising a scannable code or device.

In yet another embodiment, information storage device 38 comprises one or more scannable codes or devices, such as for example a bar code, a quick response code (QR Code), a near-field communication tags (NFC tag), a Radio Frequency Identification tags (RFID tag), or other similar scannable device, as shown in FIG. 5. In these examples, the various codes or devices may be attached to or otherwise mounted to subbase 26 and configured to be optically scanned or wirelessly read by thermostat 18 during installation.

For example, in the embodiment shown in FIG. 5, information storage device 38 comprises an NFC tag that is installed onto subbase 26 and thermostat 18 comprises an NFC receiver mounted to the back side or internal to thermostat 18. In general, the NFC tag and NFC receiver are placed so that they are in substantial in alignment and within range of the receiver (typically an inch or less) after thermostat 18 is installed onto subbase 26. This allows the tag to communicate the stored information on the tag to thermostat 18. In this implementation, upon power-on of thermostat 18 after it has been mounted to subbase 26, thermostat 18 may activate the NFC receiver to read the location and configuration parameters stored by the tag. Further, it will be appreciated that thermostat 18 could also be programmed to read the information on the tag at predetermined time intervals, or upon the occurrence of one or more events, such as after an over-the-air software update.

In yet another embodiment, information storage device 38 may comprise active circuitry (with or without any passive components) located on subbase 26. Such circuitry may comprise a memory, a processor and an interface, such as a wireless transmitter or a wired interface, such as a standard communication bus such as I2C, Serial Peripheral Interface (SPI), or a proprietary protocol to the thermostat. In the example of a wired interface, information storage device 38 may be coupled to one or more unused lugs 32 of terminal block 22.

In yet another embodiment, a personal communication device, such as a cell phone, smart watch, wearable device, computer, etc., may be used to provide a link between subbase 26 and thermostat 18 for transferring the information stored by information storage device 38 mounted to subbase 26. In this embodiment, a personal communication device may execute a software application or "app" that establishes communication with both information storage device 38 and thermostat 18. Once a connection is made, thermostat 18 may receive the information stored by information storage device 38 and then transfer it wirelessly to thermostat 18, either directly, such as via a Bluetooth connection, Wi-Fi, etc., or by transmitting the information to central thermostat controller 20 which, in turn, sends the information to thermostat 18.

Figure 6:
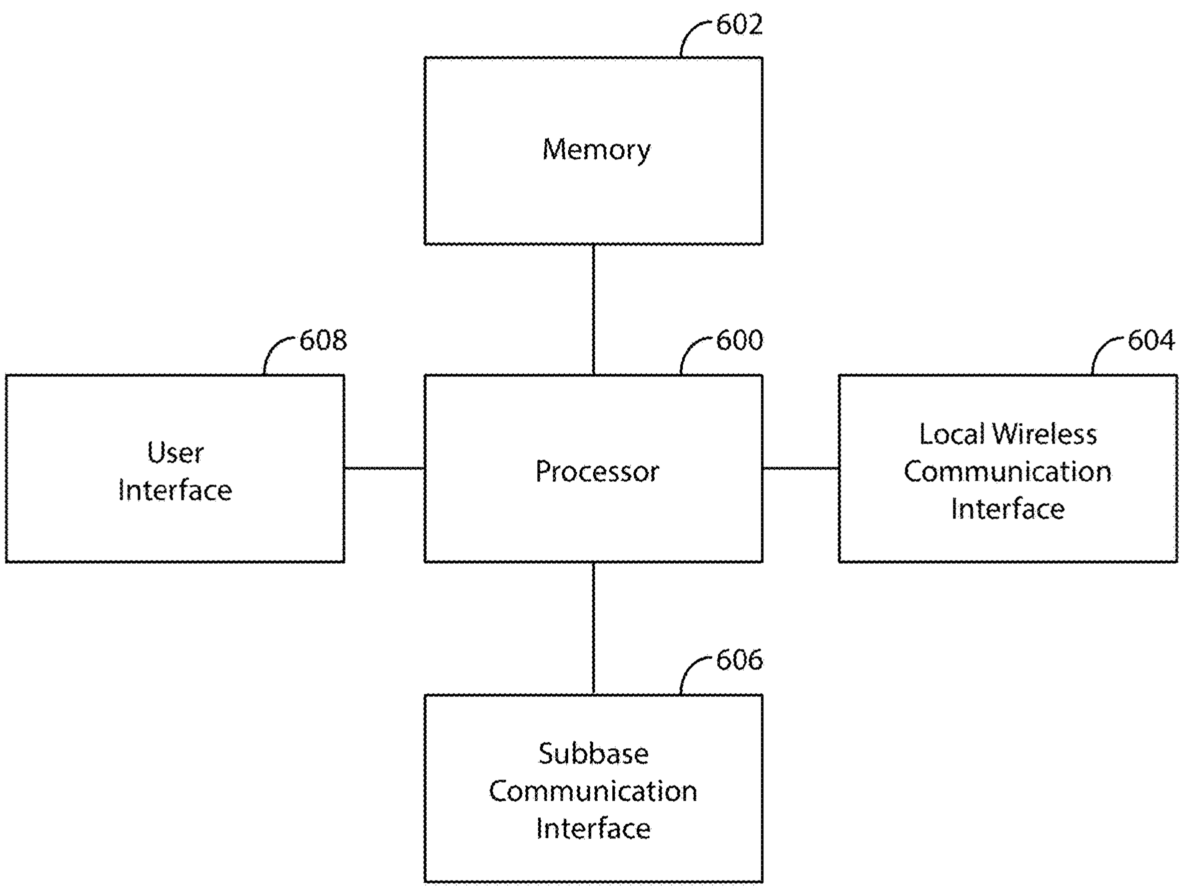
FIG. 6 is a functional block diagram of one embodiment of the thermostat as shown in FIG. 2.

FIG. 6 is a functional block diagram of one embodiment of thermostat 18. In this embodiment, thermostat 18 comprises a processor 600, a non-transitory memory 602, a local wireless communication interface 604, a subbase communication interface 606 and a user interface 608. It should be understood that the functional blocks may be connected to one another in a variety of ways, and that not all functional blocks necessary for operation of thermostat 18 are shown, for purposes of clarity, such as a power supply, thermometer, etc.

Processor 600 is configured to provide general operation of thermostat 18 by executing processor-executable instructions stored in memory 602, for example, executable code. Processor 600 typically comprises a general-purpose processor, such as one of line of ARM®-based Sitara™ processors offered by Texas Instruments of Dallas, Texas, although any one of a variety of microprocessors, microcomputers, microcontrollers, and/or custom ASICs may be used, selected based on cost, computing power, features and/or other factors. Once memory 602 is loaded with the processor-executable instructions, processor 600 may become a specialized processor for performing the inventive concepts described herein.

Memory 602 is coupled to processor 600 and comprises one or more non-transitory, information storage devices, such as RAM, ROM, flash memory, or virtually any other type of electronic, optical, or mechanical information storage device. Memory 602 is used to store the processor-executable instructions for operation of thermostat 18 as well as any information used by processor 600, such as a current time of day, day of week, an identification of a make and model of one or more HVAC equipment under control of thermostat 18, one or more temperature profiles, location information where thermostat 18/subbase 26 is located, etc. Memory 602 could, alternatively or in addition, be part of processor 600, as in the case of a microcontroller comprising on-board memory.

Local wireless communication interface 604 is coupled to processor 600 and comprises circuitry necessary to communicate with a remote entity, such as central thermostat controller 20 and/or some other entity, such as a remote computer server, a remote monitoring station, a user's mobile phone, etc., over a wide-area network, such as the Internet. Typically, local wireless communication interface 604 is a utilizes wireless communication technology, such as Wi-Fi, Zwave, Zigbee, RF, cellular or some other local or wide-area wireless communication technology.

Subbase communication interface 606 is coupled to processor 600 and comprises circuitry necessary to communicate with subbase 26 and, more specifically, with information storage device 38. Subbase communication interface 604 may comprise an optical scanner for reading a barcode or QR code on subbase 26, a wired interface coupled to pins 24 of thermostat 18, or a wireless receiver for receiving information from information storage device 38 directly, as in the case of an RFID tag, NFC tag of the like. In one embodiment, subbase communication interface 604 is not used. In this embodiment, local wireless communication interface 604 may be used to receive the information from information storage device 38 via central thermostat controller 20 or from a personal communication device relaying the information from information storage device 38 to thermostat 18.

User interface 608 is coupled to processor 600 and comprises circuitry for receiving user input and for displaying information to users. For example, user interface 608 may comprise a touch screen device for both receiving and displaying information, or a display and a plurality of hard or soft buttons. Such circuitry is well known in the art.

Figure 7:
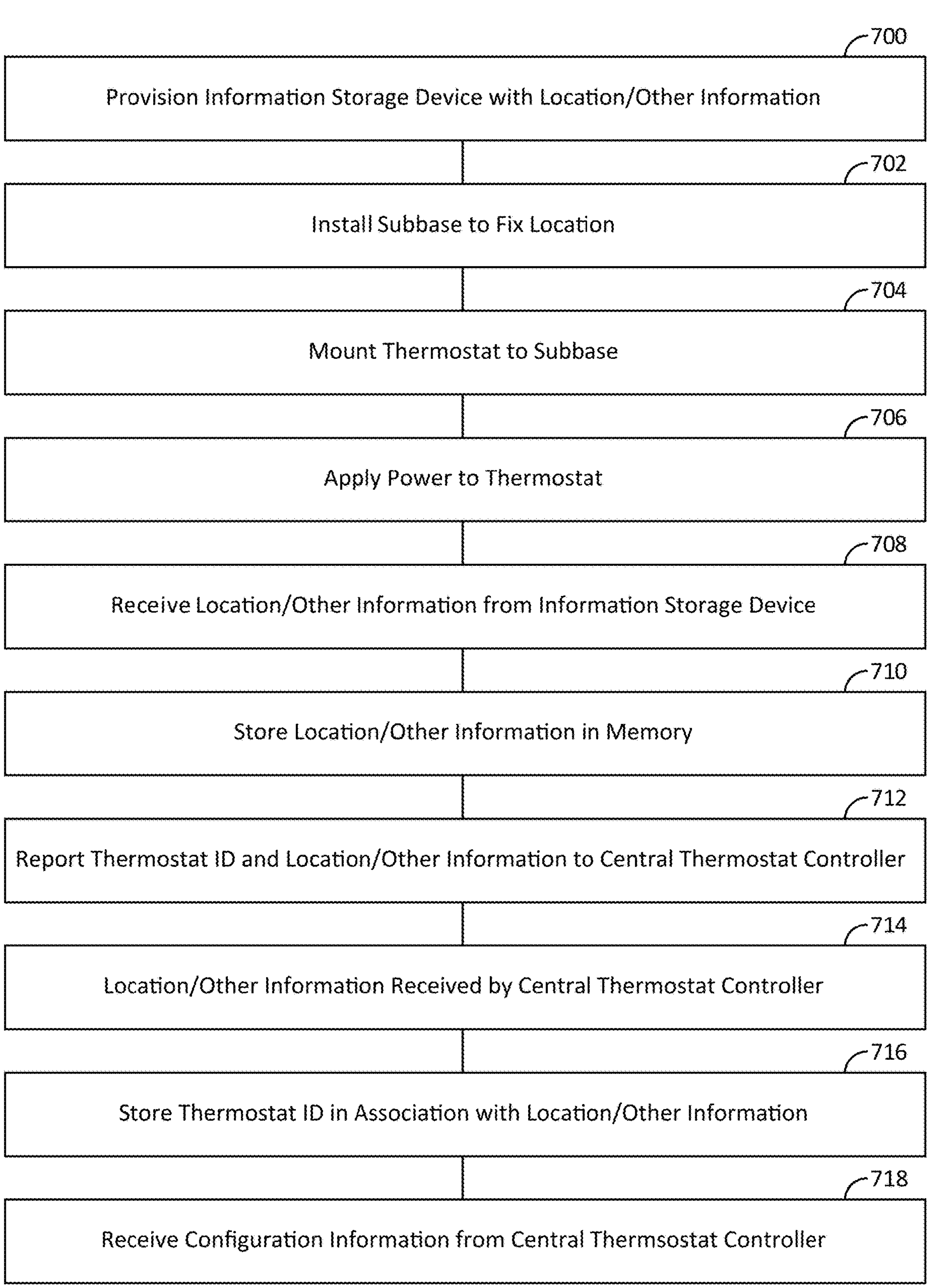
FIG. 7 is a flow diagram illustrating one embodiment of method, or algorithm, performed by the thermostat as shown in FIG. 2, for automatically associating the thermostat to a location where the thermostat is installed.

FIG. 7 is a flow diagram illustrating one embodiment of method, or algorithm, performed by thermostat 18 for automatically associating the thermostat to a location where the thermostat is installed. It should be understood that in some embodiments, not all of the steps shown in FIG. 7 are performed and that the order in which the steps are carried out may be different in other embodiments. It should be further understood that some minor method steps have been omitted for purposes of clarity.

The process begins at block 700, where information storage device 38 is provisioned with location information and, in some embodiments, other information, such as information associated with HVAC equipment controlled by thermostat 18, information associated with thermostat 18, and/or other information. The location information may comprise one or more of a room identifier, such as master bedroom, living room, hotel room number, an alpha-numeric code, etc. an identification of a structure where subbase 26 is located, such as an address, hotel name, hospital name, etc. The location information may be provided to information storage device 38 manually by an installer of subbase 26 by positioning one or more switches, or setting a digital encoder to a particular setting unique to the location of subbase 26. In other embodiments, information storage device 38 is provided with location and/or other information by generating a scannable code, such as a barcode or QR code, the scannable code comprising the location and/or other information, and affixing the scannable code to subbase 26. In yet another embodiment, location and/other information may be provided to information storage device 38 via a wired or wireless interface from a personal communication device, such as a mobile phone, laptop computer, etc. In this embodiment, a personal communication device may execute an app that loads the location and/or other information into information storage device 38 via a wireless signal, such as Bluetooth, Wi-Fi, or some other local wireless communication protocol.

In one embodiment, a local-network identifier of a local-area network, such as a Wi-Fi network, and an associated password, is provisioned into information storage device 38.

In another embodiment, in addition or alternatively to the above, information storage device 38 may be loaded with information from one thermostat and after being stored, transferred from information storage device 38 to a replacement thermostat. In this embodiment, after a first thermostat 18 has been installed onto subbase 26, first thermostat 18 may provide certain information to information storage device 38 via pins 24 and terminals 34, or via wireless communication in other embodiments. The information may comprise one or more temperature profiles used by thermostat 18, and identification of HVAC equipment being controlled by thermostat 18, configuration information pertaining to the HVAC equipment, and/or location information of thermostat 18 as determined by thermostat 18 (i.e., in an embodiment where thermostat 18 comprises a GPS or other location components or in an embodiment where thermostat 18 receives location information via local-area communication interface 604 from, for example, a personal communication device, central thermostat controller 20, or some other entity). Then, when the first thermostat is replaced with a second thermostat, the second thermostat may read the information stored on information storage device 38 and be programmed just as the first thermostat was programmed.

At block 702, an installer may affix subbase 26 to a wall or other object at the location using screws, mollies, or some other well-known installation technique. The installer typically installs subbase 26 on a wall at a location where HVAC wiring 30 protrudes. The installer typically affixes each wire of HVAC wiring 32 a respective wiring lug 32 on one of the terminal blocks 22. In some cases, not all wires are used, and in many cases, several of the wiring lugs 32 are unused by thermostat 18 for normal HVAC control.

At block 704, the installer may mount thermostat 18 to subbase 26 using well-known techniques, such as snapping thermostat 18 onto subbase 26, by retaining thermostat 18 to subbase 26 using one or more fasteners, such as clips, screws, etc. upon installation, pins 24 of thermostat 18 are mechanically and electrically coupled to respective terminals 34 of one or more terminal blocks 22 on subbase 26.

At block 706, the installer may apply power to thermostat 18 by pressing and "on" button. In other embodiments, thermostat 18 is automatically powered on when it is mechanically and electrically coupled to subbase 26 by virtue of a typical voltage present at one of the terminals 34 from at least one HVAC piece of equipment, such as 24 volts AC.

At block 708, after thermostat 18 has been powered on, processor 600 of thermostat 18 may receive the location information and/other information from information storage device 38 via subbase communication interface 606.

In an embodiment where information storage device 38 comprises one or more switches, a digital encoder, a digital encoder with diodes, and, in some cases, active and/or passive electronic components, where information storage device 38 is coupled to one or more wiring lugs 32 of one or more terminal blocks 22, processor 600 may read a value of information storage device 38 to receive the location information stored by information storage device 38. For example, if information storage device 38 comprises a dip switch with eight pins, processor 600 may determine, via subbase communication interface 606, i.e., direct wiring to terminal blocks 22, that the dip switch setting indicates a number between 0 and 255. Processor 600 may store this value in memory 602. In another example, where information storage device 38 comprises active and/or passive electronic components, processor 600 may receive the location information via subbase communication interface 606 in the form of, for example, data packets, serial communications, or some other well-known method of wired communication between information storage device 38 and processor 600.

In an embodiment where information storage device 38 comprises a scannable code or device, subbase communication interface 606 comprises either an optical scanner or a wireless receiver, respectively. In the case of a scannable code, such as a barcode or QR code, after thermostat 18 has been mounted to subbase 26 and powered on, processor 600 may receive the location information and/or other information stored by information storage device 38 via a scan of the scannable code located on subbase 26. In this embodiment, subbase communication interface 606 is typically mounted to a backside of thermostat 18 in a location such that it is in substantial alignment with the scannable code on subbase 26.

In an embodiment where information storage device 38 comprises a scannable device, such as an RFID tag or NFC tag, and subbase communication interface 606 comprises an RFID or NFC or other wireless receiver, processor 600 reads the tag located on subbase 26 to receive the location and/or other information stored by information storage device 38. Similar to the optical scanner described above, subbase communication interface 606 is located on a back portion of thermostat 18 and within range of the tag located on subbase 26 after thermostat 18 is installed onto subbase 26.

In an embodiment where information storage device 38 comprises active circuitry including a wireless transmitter, and subbase communication interface 606 comprises a wireless receiver, such as a Bluetooth receiver, processor 600 reads the location and/or other information from information storage device 38 after receiving one or more wireless signals from information storage device 38 via the wireless receiver. In this embodiment, the wireless receiver does not have to be in substantial alignment with information storage device 38 on subbase 26.

In any case, at block 710, processor 600 stores the location and/or other information in memory 602. The "other information" may comprise configuration information associated with thermostat 18 and/or particular HVAC equipment under the control of thermostat 18. This allows thermostat 18 to be replaced and automatically configured to operate the associated HVAC equipment correctly and in the same manner as thermostat 18. Configuration information may comprise one or more temperature profiles, an identification of HVAC equipment coupled to the subbase (such as a make, model, type (i.e., forced air, heat pump, fan coil unit, swamp cooler, etc.)), type of heat source (i.e., gas, electric, solar, etc.), number of fan speeds, number of stages, information pertaining to reversing valve operation of a heat pump, an identification and password of a local Wi-Fi network, or other similar network, to which a thermostat should connect, etc. In one embodiment, the configuration information may comprise a code, for example a 2-4 digit code, that represents an entire system configuration (i.e., a type of HVAC system (i.e., standard, heat pump of fan coil unit, etc.). For example, a code of 2A6 may indicate that the HVAC system comprises a forced air gas furnace and a central cooling system comprising an outdoor condenser and an evaporation coil.

Figure 8:
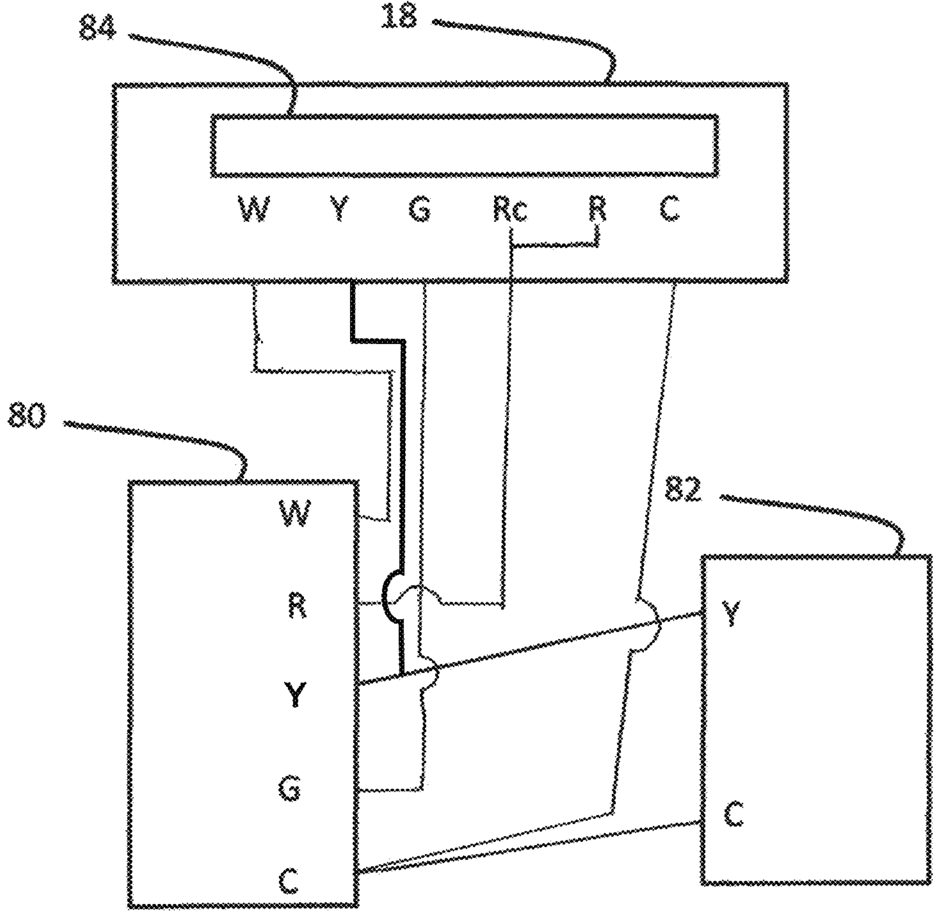
FIG. 8 is a simplified block diagram of one of the thermostats shown in FIG. 1 coupled to a traditional, residential furnace and cooling system.

At block 712, processor 600 may automatically configure itself for use with HVAC equipment identified in the information received from subbase 26. For example, processor 600 may load one or more temperature profiles into a volatile memory 202 for use in controlling the ambient air temperature during certain time periods. Processor 600 may configure itself for operation with a particular heating and/or cooling equipment identified in the information provided by subbase 26. For example, FIG. 8 is a simplified block diagram of thermostat 18 coupled to a furnace 80, which is in turn coupled to an outdoor condenser/compressor 82. When processor 600 of thermostat 18 receives information from subbase 26 that the HVAC equipment under control of thermostat 18 comprises a typical furnace (i.e., furnace 80) and a "split system" (i.e., condenser/compressor 82, processor 600 will cause a set of relays 84 to perform in a way as to control furnace 80 and outdoor condenser/compressor 82. For example, when processor 600 determines that heat is required, processor 600 may cause a first relay of relays 84 to close, connecting power terminal "R" to "heat" terminal "W", causing thermostat power (typically 24 VAC) to be provided to furnace 80. In turn, furnace 80 begins a heating cycle. When cooling is called for, processor 600 causes one or more relays to connect power terminal "R" to both cooling terminal "Y" and fan terminal "G". Operation of the relays is generally particular to the type of HVAC components under control of thermostat 18.

Figure 9:
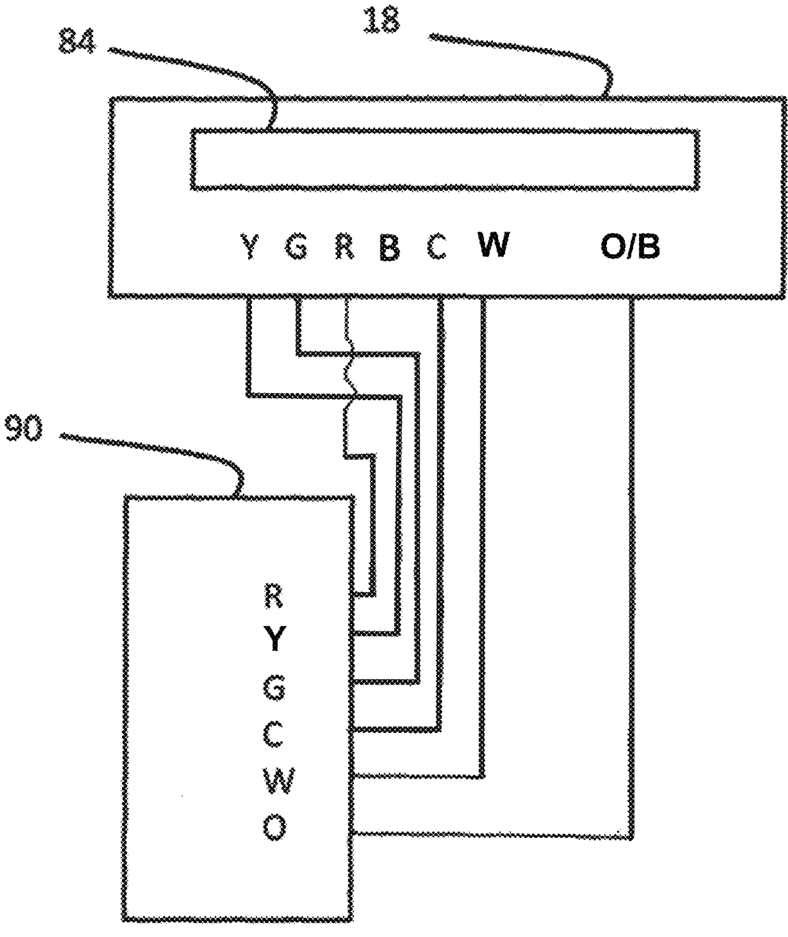
FIG. 9 is a simplified block diagram of one of the thermostats shown in FIG. 1 coupled to a heat pump system.

As an alternative example, FIG. 9 is a simplified block diagram of thermostat 18 coupled to an air handler 90 as part of a heat pump system (not shown). In this example, the heat pump system comprises an electrical heating coil for additional heating during certain modes of operation. When processor 600 of thermostat 18 receives information from subbase 26 that the HVAC equipment under control of thermostat 18 comprises a heat pump and, in some embodiments, a make of a particular heat pump under control of thermostat 18, processor 600 will cause the set of relays 84 to perform in a way as to control the heat pump system. For example, when processor 600 determines that heat is required, processor 600 may cause a one or more relays of relays 84 to close, connecting power terminal "R" to heat terminal "Y" and fan terminal "G". In turn, the heat pump system begins a heating cycle. When cooling is called for, processor 600 causes one or more relays to connect power terminal "R" to heat terminal "Y", fan terminal "G" and reversing valve terminal "O". This causes thermostat power to be applied to these terminals, causing the heat pump system to begin a cooling cycle. When processor 600 determines that additional heat is needed, processor 600 may cause one or more of the relays 84 to connect power terminal "R" to heat terminal "Y", fan terminal "G", reversing valve terminal "O", and to auxiliary terminal "Aux", which is hard wired to emergency terminal "E" in this case. This causes thermostat power to be applied to these terminals, causing the heat pump system to begin a heating cycle with additional heating provided by the electrical heating coil.

Figure 10:
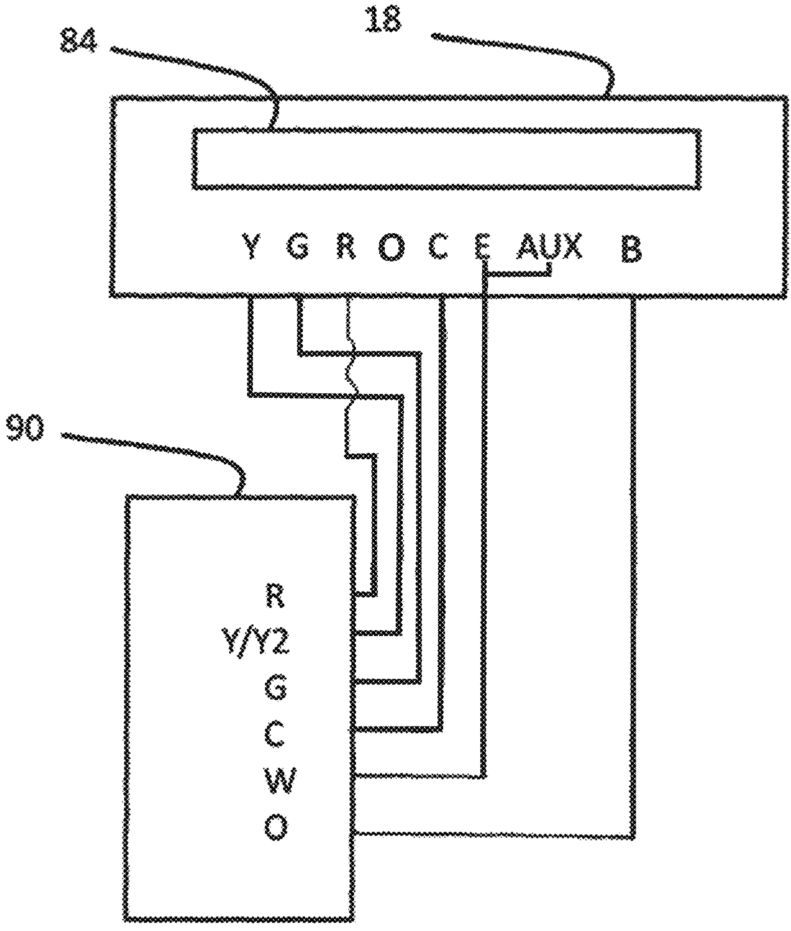
FIG. 10 is a simplified block diagram of one of the thermostats shown in FIG. 1 coupled to a different heat pump system than the one shown in FIG. 9.

In yet another example, as shown in FIG. 10, the reversing value of a heat pump may have a reverse polarity than the previous heat pump example. For example, Rheem and Ruud each manufacture heat pump systems that require voltage to a reversing valve in the heat pump in order for a heating cycle to commence and no power for cooling cycles. In these embodiments, the "B" terminal is used rather than the "O" terminal. During a cooling cycle, processor 600 causes one or more relays of relays 84 to close, in this case causing thermostat power to be applied to the "Y" and "G" terminals (reversing value turned off). For a normal heating cycle, processor 600 causes one or more relays of relays 84 to close, causing thermostat power to be applied to the "Y", "G" and "B" terminals, where terminal "B" controls whether the heat pump is heating or cooling. For added heat, processor 600 may cause one or more relays of relays 84 to close, applying thermostat power from the "R" terminal to the "Y", "G", and "W" terminals.

As shown in the above example, operation of thermostat 18, specifically relays 84, are controlled differently depending on the type of HVAC equipment under control of thermostat 18, as well as, in some cases, a make of the HVAC equipment.

At block 714, processor 600 may establish a communication with central thermostat controller 20 via local wireless communication interface 604 to report the location and/or other information received from information storage device 38. Processor 600 may additionally provide additional information to central thermostat controller 20, such as an identification of thermostat 18, i.e., a serial number, a Mac address, a local IP address, a MAC ID, a firmware version, etc.

In one embodiment, processor 600 may automatically cause thermostat 18 to join a local-area network associated with a local-network identifier, as provided in the information received from information storage device 38. In this embodiment, processor 600 joins the local-area network by transmitting a password, or some other credentialed, via wireless local communication interface 604, two a local-network control device, such as a wireless router and a Wi-Fi network. After joining the local-area network, processor 600 may communicate with central thermostat controller 20 via the local-area network and a wide-area network such as the Internet.

At block 716, central thermostat controller 20 receives the location and/or other information from thermostat 18.

At block 718, central thermostat controller 20 stores the location and/or other information from thermostat 18 in association with information associated with subbase 26.

For example, central thermostat controller 20 may store an identification of thermostat 18 in association with the location information.

At block 720, central thermostat controller 20 may send one or more messages to thermostat 18, the one or more messages comprising information pertinent to the location of thermostat 18. For example, the information may comprise a firmware update, and identification of HVAC equipment under thermostat 18's control (previously entered into the database), one or more temperature profiles, etc. Central thermostat controller 20 uses the location information and/or other information to determine where to send the one or more messages (i.e., IP address, MAC address, etc.), to determine a current version of firmware in thermostat 18, and, generally, to determine a format in which to provide this information, depending on a make and/or a model of thermostat 18.

Although certain example methods and apparatus have been described herein, the scope of coverage of this patent is not limited thereto. On the contrary, the concepts described herein cover all methods, apparatus, and articles of manufacture fairly falling within the scope of the appended claims either literally or under the doctrine of equivalents.

What is claimed is:

1. A system, comprising:

a subbase, coupled to at least one of a plurality of different heating, ventilation, and cooling (HVAC) components, comprising:

an information storage device mounted to the subbase for storing location information where the subbase has been installed; and a first plurality of terminals; and a thermostat, comprising;

a local wireless communication interface;

a subbase communication interface for receiving information from the information storage device mounted to the subbase;

a second plurality of terminals coupled with the first plurality of terminals; and a plurality of relays operable to provide electrical signals to the second plurality of terminals;

wherein the thermostat is programmed to, upon securing the thermostat to the subbase and powering up the thermostat, retrieve the location information from the subbase via the subbase communication interface, provide the location information to a server via the local wireless communication interface, receive from the server via the local wireless communication interface a configuration information that corresponds to the location information, and use the configuration information to configure a manner of operating the plurality of relays to thereby cause electrical signals to be provided to the second plurality of terminals in a manner appropriate for controlling the at least one of a plurality of different HVAC components.

2. The system of claim 1, wherein the information storage device comprises an NFC tag for storing the location information and the subbase communication interface comprises an NFC reader for reading the NFC tag to receive the location information.

3. The system of claim 1, wherein the information storage device comprises a dip switch set to a unique switch configuration that corresponds to the location information.

4. The system of claim 1, wherein the information storage device comprises an encoder configured to provide a unique voltage output that corresponds to the location information.

5. The system of claim 4, wherein the encoder is mounted to a back surface of the subbase in contact with a wall when the subbase is attached to the wall.

6. The system apparatus of claim 4, wherein the information storage device further comprises one or more diodes coupled to the encoder and coupled to an alternating current power source to block at least a portion of an alternating current power signal from the alternating current power source.

7. The system of claim 1, wherein the information storage device further stores a local-network identifier and an associated password of the local network identifier, and the thermostat joins a local-area network associated with the local-network identifier by transmitting the password via the local wireless communication interface to the local-area network associated with the local-network identifier.

8. The system of claim 7, wherein the thermostat is configured to transmit an identifier for the thermostat and the location information via the local-area network to a central thermostat controller for the central thermostat controller to store the identifier in association with the location information.

9. The system of claim 1, wherein the location information comprises an identification of a hotel room.

10. A method, performed by a thermostat, comprising:

receiving from a subbase via a subbase communication interface of the thermostat a location information of where the subbase has been installed;

providing the location information to a server via a local wireless communication interface of the thermostat;

receiving from the server via the local wireless communication interface a configuration information that corresponds to the location information; and using the configuration information to configure a manner of operating a plurality of relays of the thermostat to thereby cause electrical signals to be provided to a first plurality of terminals of the thermostat coupled to a second plurality of terminals of the subbase in a manner appropriate for controlling at least one of a plurality of different HVAC components coupled to the subbase.

11. The method of claim 10, wherein receiving the location information from the subbase comprises transmitting an NFC interrogation signal to an NFC tag mounted to the subbase and receiving the location information from the NFC tag.

12. The method of claim 10, wherein receiving the location information from the subbase comprises determining a state of a plurality of switches located on the subbase.

13. The method of claim 10, wherein receiving the location information from the subbase comprises determining a state of an encoder mounted to the subbase.

14. The method of claim 10, wherein the location information is received automatically by the thermostat after the thermostat has been coupled to the subbase and after the thermostat has been energized.

15. The method of claim 13, wherein determining a state of the encoder comprises reading a voltage from the encoder, the voltage comprising at least a half-sinusoid waveform formed by a diode coupled to the encoder.

16. The method of claim 10, wherein an information storage device located on the subbase stores a local-network identifier and an associated password of the local network identifier, the method further comprising:

receiving the local-network identifier and associated password from the information storage device located on the subbase; and joining a local-area network associated with the local-network identifier by transmitting the password to the local-area network associated with the local-network identifier via the local wireless communication interface.

17. The method of claim 16, further comprising providing an identifier for the thermostat and the location information to a remote, central thermostat controller for the remote, central thermostat controller to store the identifier in association with the location information.

18. The method of claim 10, wherein the location information comprises an identification of a hotel room.

* * * * *